United States Patent
Kito et al.

(10) Patent No.: US 10,102,426 B2
(45) Date of Patent: Oct. 16, 2018

(54) LEAD IMAGE RECOGNITION METHOD AND LEAD IMAGE RECOGNITION DEVICE, AND IMAGE PROCESSING-USE COMPONENT DATA CREATION METHOD AND IMAGE-PROCESSING-USE COMPONENT DATA CREATION DEVICE

(71) Applicant: FUJI CORPORATION, Chiryu (JP)

(72) Inventors: Shuichiro Kito, Toyota (JP); Taizo Umezaki, Tajimi (JP)

(73) Assignee: FUJI CORPORATION, Chiryu (JP)

( * ) Notice: Subject to any disclaimer, the term of this patent is extended or adjusted under 35 U.S.C. 154(b) by 0 days.

(21) Appl. No.: 15/314,691

(22) PCT Filed: Jun. 6, 2014

(86) PCT No.: PCT/JP2014/065043
§ 371 (c)(1),
(2) Date: Nov. 29, 2016

(87) PCT Pub. No.: WO2015/186236
PCT Pub. Date: Dec. 10, 2015

(65) Prior Publication Data
US 2017/0147856 A1    May 25, 2017

(51) Int. Cl.
*G06K 9/00* (2006.01)
*G01B 11/02* (2006.01)
(Continued)

(52) U.S. Cl.
CPC .......... *G06K 9/0053* (2013.01); *G01B 11/022* (2013.01); *G01J 1/44* (2013.01); *G06K 9/6212* (2013.01); *G06T 7/62* (2017.01)

(58) Field of Classification Search
CPC ...... G06K 9/0053; G06K 9/6212; G06K 9/00; G01B 11/022; G01J 1/44; G06T 7/62; G06T 7/0006; G06T 2207/30148
See application file for complete search history.

(56) References Cited

U.S. PATENT DOCUMENTS 4,589,140 A * 5/1986 Bishop ................. G01R 31/308
                                                            348/130
5,493,594 A * 2/1996 Hamada ................. G01N 23/04
                                                            378/34
(Continued)

FOREIGN PATENT DOCUMENTS

| JP | 10-283479 A | 10/1998 |
|---|---|---|
| JP | 2011-211088 A | 10/2011 |
| JP | 2013-114652 A | 6/2013 |

OTHER PUBLICATIONS

Extended European Search Report dated Apr. 7, 2017 in Patent Application No. 14893844.2.
(Continued)

*Primary Examiner* — Yon Couso
(74) *Attorney, Agent, or Firm* — Oblon, McClelland, Maier & Neustadt, L.L.P.

(57) ABSTRACT

When recognizing leads by processing an image captured by a camera of a component provided with a single row or multiple rows of leads of the same size and shape at a regular pitch, waveform analysis of a change pattern of brightness (pixel value) along multiple lines set in a vertical, a horizontal, or a diagonal direction of the image is performed so as to identify a region in which the brightness changes cyclically as a lead recognition target region in which there is a possibility of a lead existing. Then, image recognition of leads is performed in the lead recognition target region.

12 Claims, 7 Drawing Sheets

(51) Int. Cl.
*G01J 1/44* (2006.01)
*G06K 9/62* (2006.01)
*G06T 7/62* (2017.01)

(56) References Cited

U.S. PATENT DOCUMENTS

| | | | |
|---|---|---|---|
| 6,647,132 B1 | 11/2003 | Montillo et al. | |
| 7,715,616 B2* | 5/2010 | Moriya | H05K 13/08 |
| | | | 382/145 |
| 2015/0078518 A1* | 3/2015 | Tziazas | G06T 7/001 |
| | | | 378/53 |
| 2016/0148366 A1* | 5/2016 | Amano | G06T 7/0008 |
| | | | 348/87 |

OTHER PUBLICATIONS

"Texture Energies for 1D Rays" Internet Archive Wayback Machine, Retrieved from http://homepages.inf.ed.ac.uk/rbf/CVonline/LOCAL_COPIES/DENZLER1/node9.html, XP055359456, Retrieved on Mar. 28, 2017, 2 Pages.

Philip McLeod, et al., "A Smarter Way to Find Pitch" International Computer Music Conference Proceedings, Department of Computer Science, XP055359472, Jan. 1, 2005, 4 Pages.

International Search Report dated Aug. 19, 2014 in PCT/JP2014/065043 filed Jun. 6, 2014.

Office Action dated Apr. 3, 2018 in corresponding Japanese Patent Application No. 2016-525642 (with English Translation), 5 pages.

Office Action dated Jul. 3, 2018 in corresponding Chinese Application No. 201480079514.9, along with an English translation.

* cited by examiner

Average magnitude difference function D(τ)

Average magnitude difference function differential D'(τ)

LEAD IMAGE RECOGNITION METHOD AND LEAD IMAGE RECOGNITION DEVICE, AND IMAGE PROCESSING-USE COMPONENT DATA CREATION METHOD AND IMAGE-PROCESSING-USE COMPONENT DATA CREATION DEVICE

TECHNICAL FIELD

The present application relates to a lead image recognition method and lead image recognition device that recognize leads by processing an image of a leaded component captured by a camera, and to an image-processing-use component data creation method and image-processing-use component data creation device.

BACKGROUND ART

In recent years, as disclosed in patent literature 1 (JP-A-2011-211088), technology is being developed for automatically creating image-processing-use component data used when performing image recognition of leaded components to be mounted by a component mounter. With this method for automatically creating image-processing-use component data, an image of a component with the same specifications as a leaded component to be used in production is captured in advance, the image is image processed, and shape data (such as dimensions of the body of the component, lead positions, lead quantity, lead pitch, lead width, and lead length) of the component is measured, then image-processing-use component data including that shape data is created. Then, after starting production, a component picked up by a suction nozzle of a component mounter is imaged by a camera and image recognition of the size and shape of the component is performed, and the recognition result is then compared with the image-processing-use component data created earlier so as to determine the type, pickup position, pickup orientation, and so on, of the picked up component.

CITATION LIST

Patent Literature

Patent Literature 1: JP-A-2011-211088

SUMMARY

Typical leaded components have a simple construction with multiple leads arranged at a regular pitch (regular interval) on two or four sides and no metal portions that are easily confused with the leads, thus for these components, as shown in FIGS. 2 and 3, leads can be recognized with relatively good accuracy from a captured image even with a conventional image recognition method; however, in recent years, there has been an increase in leaded components with a complicated structure in which there are metal portions and the like that have a size and shape easily confusable with leads. For example, when recognizing the leaded component shown in FIG. 4 with a conventional image recognition method, there are cases in which the coil portions shown in the captured image are mistakenly recognized as leads. Further, when recognizing the leaded connector component shown in FIG. 5 with a conventional image recognition method, there are cases in which the metal fittings shown in the captured image are mistakenly recognized as leads. In this manner, with conventional image recognition methods, when recognizing an image of a leaded component with a metal portion that is easily confusable with a lead, it may not be possible to distinguish between a lead and a metal portion or the like with a size and shape easily confusable with a lead, thus leading to a problem of a high lead mis-recognition rate.

Therefore, an object of the present disclosure is to improve lead recognition accuracy by preventing metal portions or the like that are easily confusable with leads being mis-recognized as leads when performing image recognition of leaded components with a metal portion or the like with a size and shape easily confusable with a lead.

To solve the above problems, the present disclosure, when recognizing leads by processing an image captured by a camera of a component provided with a single row or multiple rows of leads of the same size and shape at a regular pitch, performs waveform analysis of a change pattern of brightness (pixel value) along multiple lines set in a vertical, a horizontal, or a diagonal direction of the image so as to identify a region in which the brightness changes cyclically as a lead recognition target region in which there is a possibility of a lead existing, and then performs image recognition of leads in the lead recognition target region.

Because leaded components typically have a single row or multiple rows of leads of the same size and shape arranged at a regular pitch, a change pattern of brightness along a line that overlaps a lead row in an image captured of the component is a cyclical waveform pattern with single wavelength with a length corresponding to the lead pitch; however, a change pattern of brightness along a line that does not overlap a lead row is not a cyclical waveform pattern.

Considering this, the present disclosure, after identifying a region in which the brightness changes cyclically as a lead recognition target region in which there is a possibility of a lead existing by analyzing the waveform of a change pattern of brightness along multiple lines in an image, performs image recognition in that lead recognition target region. By this, in cases in which there are metal portions or the like that are easily confusable with leads in a region outside the lead recognition target region, the mis-recognition of these metal portions or the like as leads is prevented, thus the recognition accuracy of leads is improved.

In this case, the waveform analysis may be performed using one of a normalized square difference function, an average magnitude difference function, and a Fourier transformation; that is, the waveform analysis may be performed to identify the lead recognition target region using a function or analysis method suitable for evaluating whether a brightness change is cyclical.

Also, when creating image-processing-use component data used when performing image recognition of a leaded component to be mounted using a component mounter, creating imaging-processing-use component data including at least one from lead position, lead quantity, lead pitch, lead width, or lead length may be performed using a recognition result of leads from an image recognized using a lead image recognition method according to the present disclosure. By using a lead recognition method of the present disclosure as described above, because the mis-recognition of metal portions and the like that are easily confusable with leads as leads is prevented, it is possible to automatically create image-processing-use component data with higher reliability than that created with conventional technology.

DESCRIPTION OF EMBODIMENTS

Figure 1:
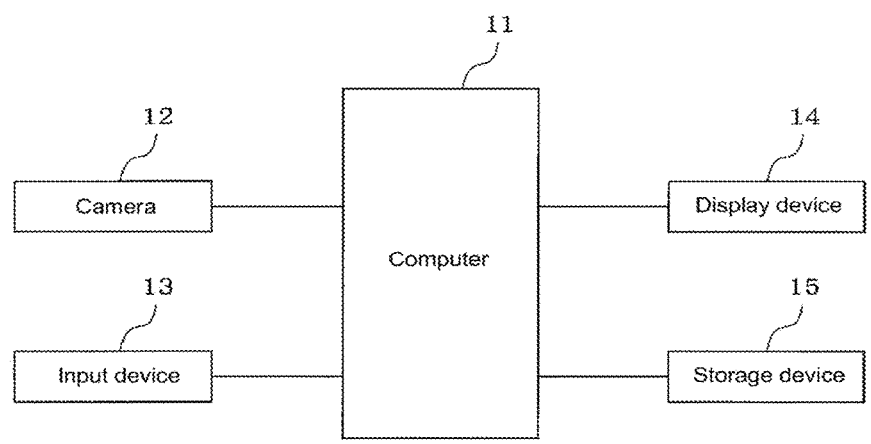
FIG. 1 is a block diagram showing the configuration of an image-processing-use component data creation device, which is an embodiment of the present disclosure.

An embodiment of the disclosure is described below. As shown in FIG. 1, an image-processing-use component data creation device is provided with computer 11 such as a personal computer; camera 12 with an in-built image sensor such as a CMOS sensor that acquires a gray scale image by imaging a component that is a target for creation of image-processing-use component data; input device 13 such as a keyboard, mouse, or touch panel; display device 14 such as a CRT; and storage device 15 that stores a program for lead image recognition and image-processing-use component data creation and various other data and the like.

The image-processing-use component data creation device may be configured to use a control system of a component mounter, or may use a dedicated image-processing-use component creation device (such as a combination of a desktop imaging device and a personal computer) configured separately to a control system of a component mounter. In a case in which the image-processing-use component data creation device is configured to use a control system of a component mounter, camera 12 may be a camera that images an area below a component held by a suction nozzle of the component mounter (a so-called component camera).

Computer 11 performs waveform analysis of the change pattern of the brightness (pixel value) along multiple lines set in lengthways and sideways (vertical and horizontal) directions in an image captured by camera 12, thereby functioning as a waveform analysis means that identifies a region in which the brightness changes cyclically as a lead recognition target region in which there is a possibility of a lead existing, and functions as an image recognition means that performs image recognition of leads in the lead recognition target region identified during the waveform analysis processing, and further functions as an image-processing-use component data creation device that creates image-processing-use component data that includes data of at least one of any of lead position, lead quantity, lead pitch, lead width, or lead length using a result of image recognition of leads. These functions are described below.

Figure 6:
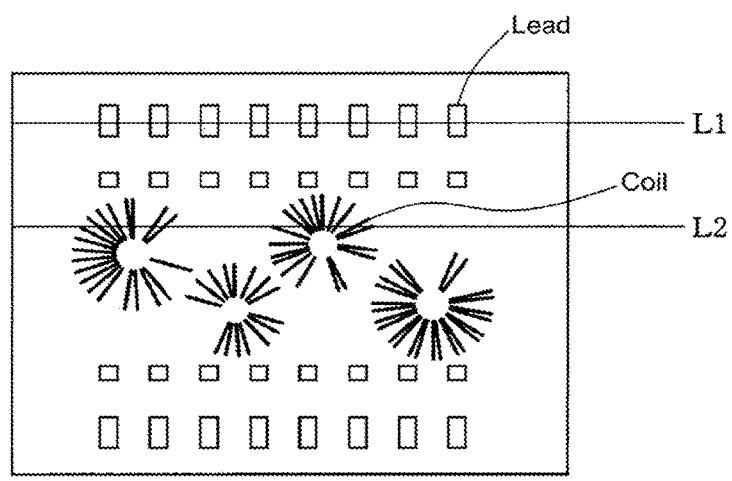
FIG. 6 illustrates a method for setting lines for waveform analysis in an image of a leaded component.

Because leaded components typically have a single row or multiple rows of leads of the same size and shape arranged at a regular pitch, as shown in FIG. 6, a change pattern of brightness along a line that overlaps a lead row in an image captured of the component is a cyclical waveform pattern with single wavelength with a length corresponding to the lead pitch; however, a change pattern of brightness along a line that does not overlap a lead row is not a cyclical waveform pattern.

Considering this, in the present embodiment, using computer 11, after identifying a region in which the brightness changes cyclically as a lead recognition target region in which there is a possibility of a lead existing by analyzing the waveform of a change pattern of brightness along multiple lines in an image, performs image recognition in that lead recognition target region.

First, waveform analysis processing is described. Described below is the present embodiment, in which waveform analysis processing is performed using an average magnitude difference function or a normalized square difference function.

Waveform analysis processing using an average magnitude difference function An average magnitude difference function (AMDF) is a function that expresses the strength of how cyclical a signal is; in the field of voice recognition, this is one method used to detect pitch. This average magnitude difference function is defined by equation 1 below.

$$D(\tau) = \frac{1}{W - \tau - 1} \sum_{j=0}^{N-\tau-1} |x_j - x_{j+\tau}| \quad \text{Equation 1}$$

In equation 1 above, $D(\tau)$ is an average magnitude difference function for a delay $\tau$, where W is the size of the window for the waveform analysis, and x is an X coordinate of the image (in a case in which analyzing with the X direction as horizontal).

A larger value of $D(\tau)$ calculated using the above equation 1 means that the change pattern of the brightness is more strongly cyclical.

Waveform analysis processing using a normalized square difference function A normalized square difference function (NSDF) is defined by equation 2 below.

$$n'(\tau) = 1 - \frac{m'(\tau) - 2r'(\tau)}{m'(\tau)} \quad \text{Equation 2}$$
$$= \frac{2r'(\tau)}{m'(\tau)}$$

In equation 2 above, $n'(\tau)$ is a normalized square difference function for a delay $\tau$, $m'(\tau)$ is a function defined by equation 8 given below, and $r'(\tau)$ is an autocorrelation function (ACF) defined by equation 4 given below.

A larger value of normalized square difference function $n'(\tau)$ calculated using the above equation 2 means that the change pattern of the brightness is more strongly cyclical. There are largely two types of autocorrelation function, and when classifying these as type one and type two, a type one autocorrelation function is defined by equation 3 below.

$$r(\tau) = \sum_{j=0}^{W-1} x_j x_{j+\tau} \quad \text{Equation 3}$$

In equation 3 above, $r(\tau)$ is an autocorrelation function for a delay $\tau$, where W is the initial value of the size of the window for the waveform analysis. A type two autocorrelation function is defined by equation 4 below.

$$r'(\tau) = \sum_{j=0}^{W-1-\tau} x_j x_{j+\tau} \quad \text{Equation 4}$$

The type two autocorrelation function $r'(\tau)$ defined by the above equation 4 has a characteristic that the integral range decreases as T increases.

$m'(\tau)$ included in the left side of the above equation 2 is determined by a square difference function (SDF). Similar to an autocorrelation function, there are two type of this square difference function, and when classifying these as type one and type two, a type one square difference function is defined by equation 5 below.

$$d(\tau) = \sum_{j=0}^{W-1} (x_j - x_{j+\tau})^2 \quad \text{Equation 5}$$

In equation 5 above, $d(\tau)$ is a type one square difference function for a delay $\tau$, where W is the initial value of the size of the window. Similarly, a type two square difference function is defined by equation 6 below.

$$d'(\tau) = \sum_{j=0}^{W-1-\tau} (x_j - x_{j+\tau})^2 \quad \text{Equation 6}$$

In equation 6 above, $d'(\tau)$ is a type two square difference function for a delay $\tau$, and in a similar manner to the type two autocorrelation function $r'(\tau)$ above, the integral range decreases as $\tau$ increases. For either the type one or the type two square difference function, the minimum is obtained when $\tau=0$, and conversely, for the autocorrelation functions, the maximum is obtained when $\tau=0$. Resolving equation 5 above, as shown by equation 7 below, we can see that an autocorrelation function is included in the square difference function.

$$d'(\tau) = \sum_{j=0}^{W-1-\tau} (x_j^2 + x_{j+\tau}^2 - 2x_j x_{j+\tau}) \quad \text{Equation 7}$$

Here, the equation $m'(\tau)$ is defined by equation 8 below.

$$m'(\tau) = \sum_{j=0}^{W-1-\tau} (x_j^2 + x_{j+\tau}^2) \quad \text{Equation 8}$$

By substituting equation 8 and equation 4 into the right side of equation 7, the following equation is derived.

$d'(\tau)=m'(\tau)-2r'(\tau)$

Described next is the method for identifying a lead recognition target region using the normalized square difference function. Generally, leaded components have leads of the same shape and size arranged at a regular pitch in a horizontal direction or a vertical direction. Considering this, in the present embodiment, after capturing a change pattern of brightness in a vertical direction and horizontal direction (lengthways and sideways directions) of an image of a leaded component in the form of a waveform of a signal, first the value of a normalized square difference function is calculated for each line in the image. Below, for ease of understanding, as shown in FIG. 6, descriptions are given for a case in which waveform analysis is performed for a change pattern of brightness in a horizontal direction, with lines L1 and L2 set as multiple lines for waveform analysis in a horizontal direction in an image of a leaded component.

Figure 7:
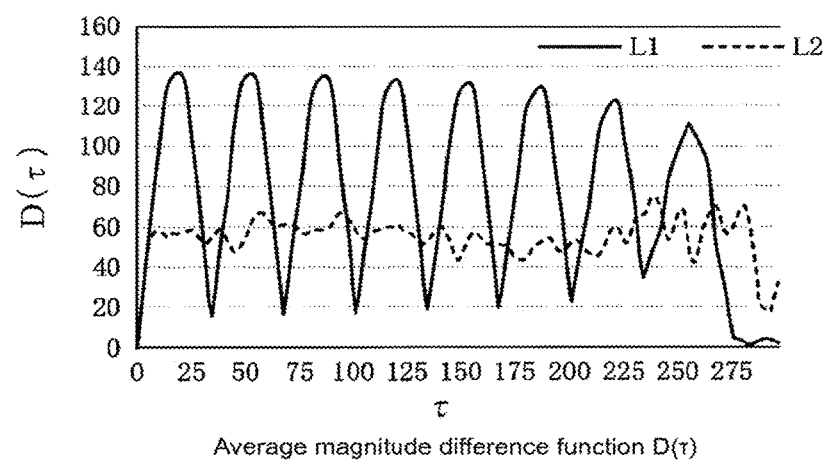
FIG. 7 shows the waveforms of the change patterns of the brightness along lines L1 and L2 calculated by an average magnitude difference function.
Figure 8:
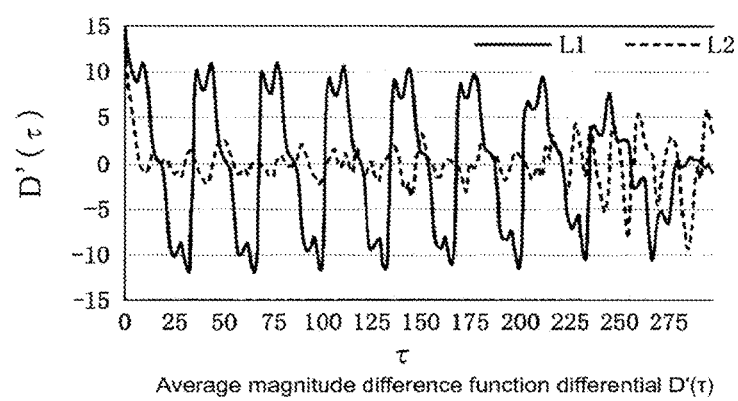
FIG. 8 shows the differential of the waveforms along lines L1 and L2 calculated by an average magnitude difference function.
Figure 9:
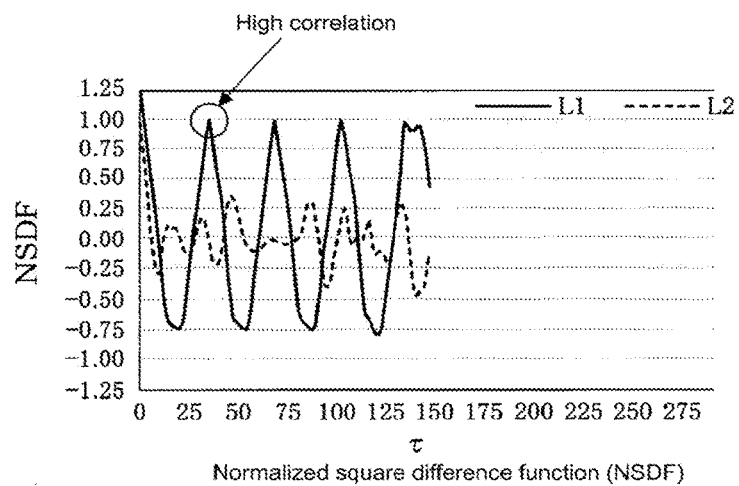
FIG. 9 shows the waveforms along lines L1 and L2 calculated by a normalized square difference function.

In FIG. 6, line L1 overlaps a row of leads visible in the image, and line L2 does not overlap a row of leads in the image. FIG. 7 shows the waveforms of the change patterns of the brightness along lines L1 and L2 calculated by an average magnitude difference function. FIG. 8 shows the differential of the waveforms along lines L1 and L2 calculated by an average magnitude difference function. FIG. 9 shows the waveforms along lines L1 and L2 calculated by a normalized square difference function.

The values for the average magnitude difference function are always positive (refer to FIG. 7) because an absolute value of the difference when the waveform is shifted is obtained. However, the normalized square difference function is not useful because a negative correlation does not give a negative value. Thus, in the present embodiment, the waveforms along lines L1 and L2 calculated by the average magnitude difference function (refer to FIG. 7) are differentiated (refer to FIG. 8), and then, by using the normalized square difference function, it can be determined that high locations on the graph have positive correlation (refer to FIG. 9).

We can see that the average magnitude difference function for line L1 that overlaps a row of leads is cyclical to some degree, but for line L2 that does not overlap a row of leads, the function is not cyclical. The differentiated waveform of the waveform of the average magnitude difference function is shown in FIG. 8. Naturally, we can confirm that the waveform of line L1 that overlaps a row of leads is cyclical in the differentiated waveform. With respect to this differentiated waveform, the result of that obtained from the normalized square difference function is shown in FIG. 9. We can see that a peak value with extremely high correlation is obtained at the first pitch for line L1 that overlaps a row of leads. From the above, it is possible to identify a line for which the brightness changes cyclically, but it is not yet possible to identify the starting X coordinate and the ending X coordinate of the row of leads. The method for obtaining the starting X coordinate and the ending X coordinate of the row of leads is described below. First, with respect to the region identified as being cyclical from the above waveform analysis, brightness projection to the X direction (horizontal direction) is performed. Average projection brightness T(x) is represented by equation 9 below.

$$T(x) = \frac{\sum_{y=y_1}^{y_2} I(x, y)}{y_2 - y_1} \quad \text{Equation 9}$$

In equation 9 above, I(x, y) is the brightness level of the image at coordinates (x, y), and y1 and y2 are continuous Y coordinates representing the start and end of the region identified as being cyclical. Because this region has already been identified as being cyclical, and the pitch has also been detected, when standard deviation S(x) of the waveform data projected at the detected pitch is obtained, in the region in which leads exist, the standard deviation S(x) is high, and in other regions, the standard deviation S(x) is low. This standard deviation S(x) is defined by equation 10 below.

$$S(x) = \sqrt{\frac{1}{p} \sum_{n=x-\frac{p}{2}}^{x+\frac{p}{2}} (T(n) - Tav(x))^2}$$ Equation 10

In equation 10 above, p is the detected pitch, and Tav(x) is the pitch p interval average projected brightness. Tav(x) is defined by equation 11 below.

$$Tav(x) = \frac{1}{p} \sum_{n=x-\frac{p}{2}}^{x+\frac{p}{2}} T(n)$$ Equation 11

Figure 10:
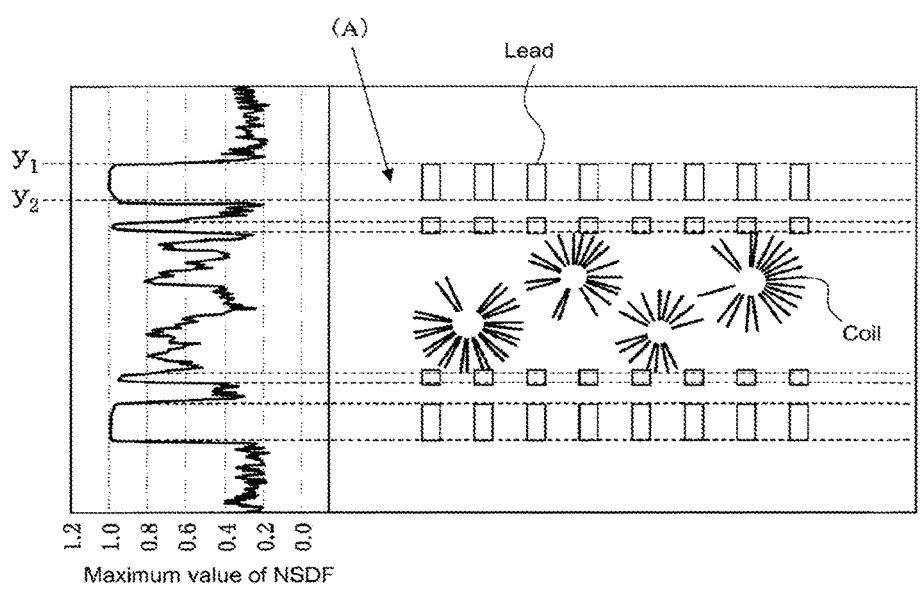
FIG. 10 illustrates processing for extracting lines that are cyclical.
Figure 11:
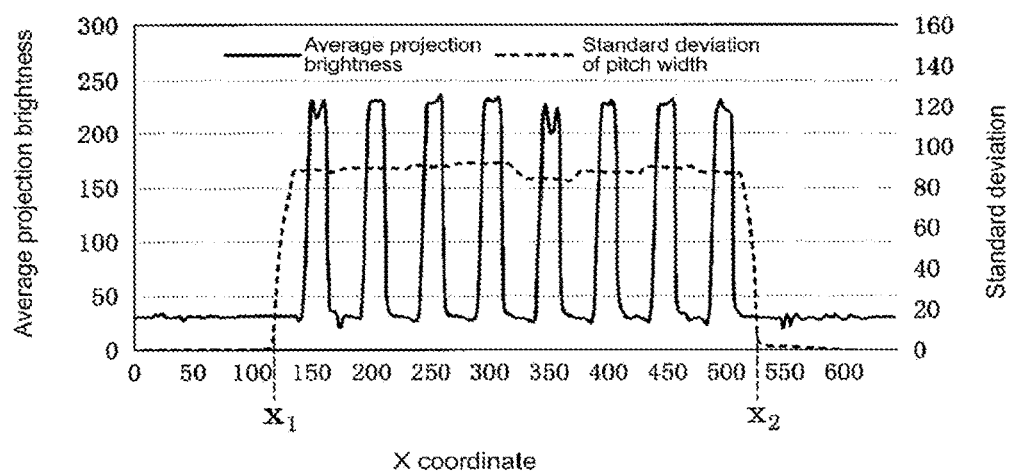
FIG. 11 is a graph showing the average projection brightness and standard deviation of the region shown by (A) in FIG. 10.
Figure 12A:
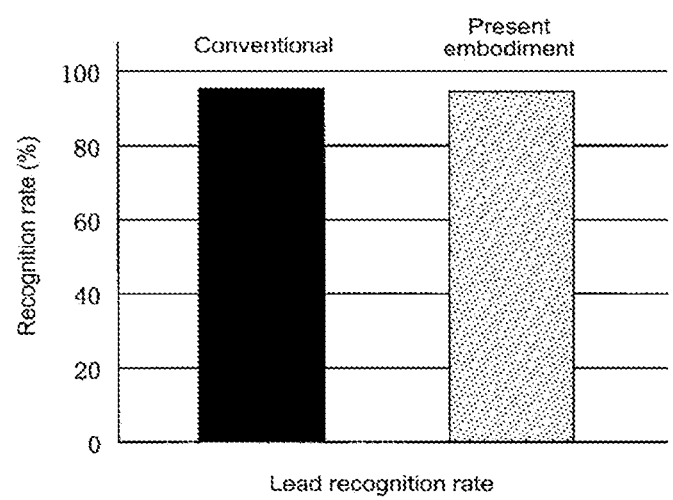
FIGS. 12A and 12B show experimental results comparing the lead recognition rate and mis-recognition rate for a conventional lead image recognition method and the lead image recognition method of an embodiment of the disclosure.
Figure 12B:
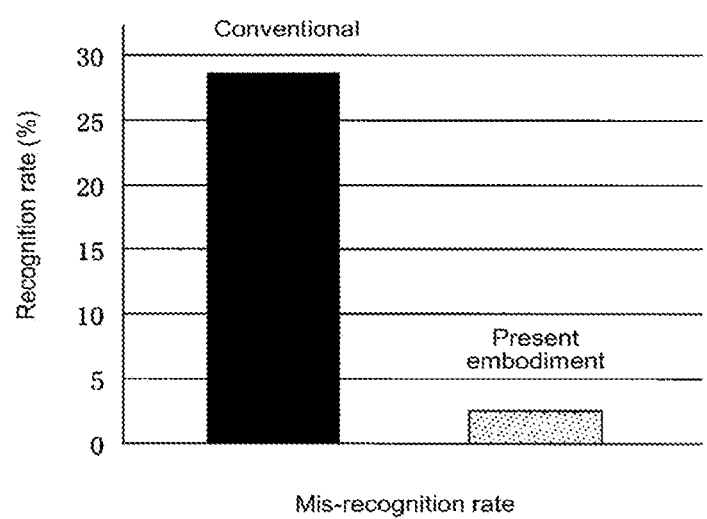

FIG. 11 is a graph showing the average projection brightness and standard deviation of the region shown by (A) in FIG. 10. By extracting only the regions with a high standard deviation, the starting and ending coordinates $x_1$ and $x_2$ of the row of leads are obtained.

Figure 2:
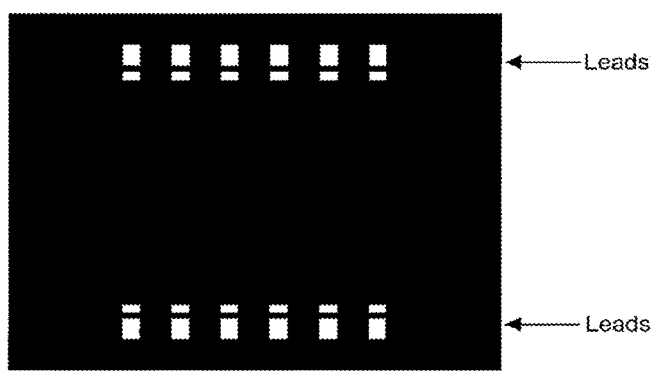
FIG. 2 is a diagram showing an example of an image of a component with rows of leads formed on two sides.
Figure 3:
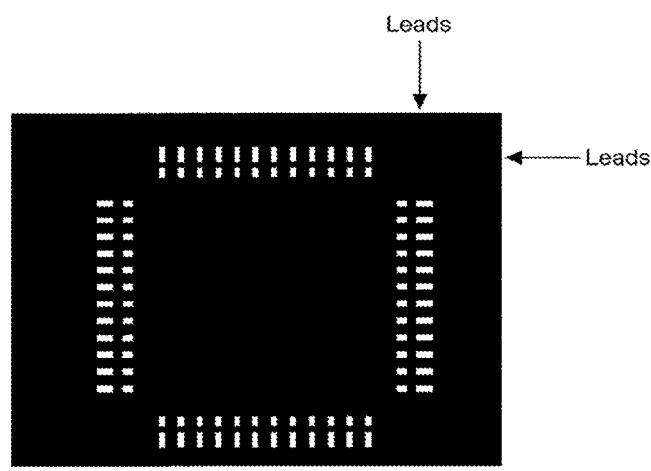
FIG. 3 is a diagram showing an example of an image of a component with rows of leads formed on four sides.

With the leaded component shown in FIG. 2, because leads extend only in the left-right direction (X direction) of the component, the above waveform analysis processing only needs to be performed in the left-right direction (X direction); however, for the leaded component shown in FIG. 3, because leads extend in both the up-down and left-right directions (X direction and Y direction) of the component, similar processing must be performed in the lengthways and sideways directions (X direction and Y direction) in the image, so as to extract a region in which a row of leads exists in the vertical direction (Y direction) and a region in the which a row of leads exists in the horizontal direction (X direction).

As above, after identifying a region in the image of the leaded component in which the brightness changes cyclically as a lead recognition target region in which there is a possibility of a lead existing, image recognition is performed in that lead recognition target region. In this case, for lead image recognition, a detection device that uses AdaBoost and Haar-Like characteristics, which are often used for facial detection, is used. It is also acceptable to use image recognition using HOG characteristics or the like, but because characteristics of the brightness slope of the lead tips and characteristics of the brightness difference of regions apply, with image recognition using HOG characteristics, the lead recognition rate has a tendency to be lower compared to with a method using Haar-Like characteristics. Lead image recognition is not limited to these methods, for example, a method disclosed in JP-A-2007-142039, JP-2941617, or the like may be used.

Figure 4:
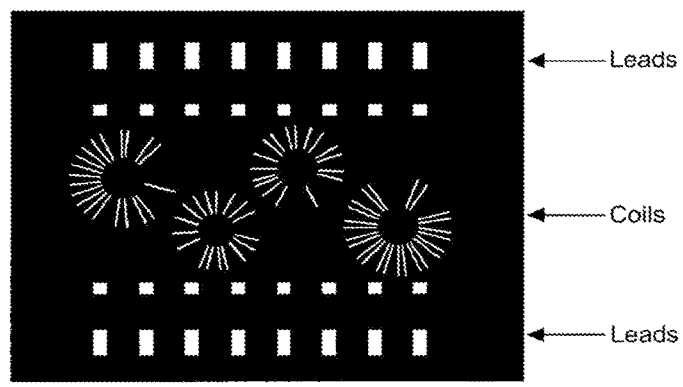
FIG. 4 is a diagram showing an example of an image of a component provided with rows of leads and coils.
Figure 5:
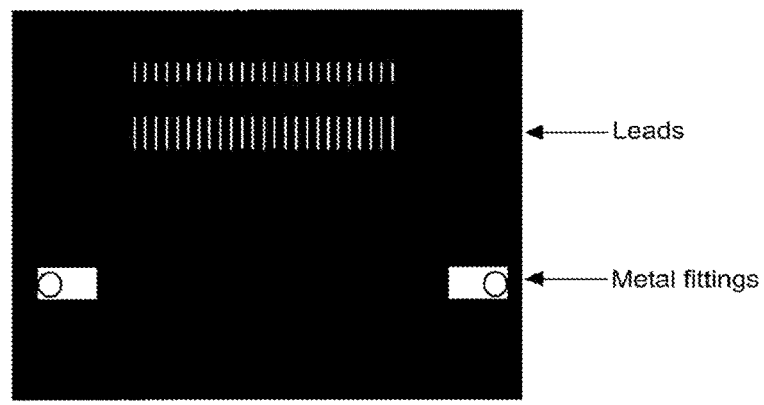
FIG. 5 is a diagram showing an example of an image of a connector component with leads.

The inventors performed an experiment to compare the lead recognition rates and mis-recognition rates for the method of the present embodiment in which image recognition of leads is performed by identifying a lead recognition target region within an image of a leaded component, and a conventional method in which image recognition of leads is performed from the entire image of the component. Here, the lead recognition rate is the percentage of leads recognized correctly with respect to the total quantity of leads on the entire component, and the lead mis-recognition rate is the percentage of non-lead items incorrectly identified as leads. The image samples used in the experiment were the sample images of a leaded component with metal portions or the like with a size and shape easily confusable with a lead, as shown in FIGS. 4 and 5.

Although there was hardly any difference in the lead recognition rate for the present disclosure and the lead recognition rate for the conventional method, it was confirmed that the mis-recognition rate was reduced greatly, from 24.5% to 2.4%, by using the present disclosure. Although the recognition rate slightly decreased from 96.8% to 95.7%, this is thought to be due to the existence on a component of one to two leads that are not cyclical, and are thus not included by region identification performed based on a cyclical pattern. Overall, leaded components with only one to two leads are mostly regular components with a simple size and shape, thus for these components lead recognition may be performed using a conventional method.

Using the lead recognition results of the present embodiments, image-processing-use component data including data of a measurement of at least one of lead position, lead quantity, lead pitch, lead width, or lead length is created.

In the present embodiment described above, after identifying a region in which the brightness changes cyclically as a lead recognition target region in which there is a possibility of a lead existing by analyzing the waveform of a change pattern of brightness along multiple lines in an image, image recognition is performed in that lead recognition target region, thus even in cases in which there is a metal portion or the like that is easily confusable with a lead in a region outside the lead recognition target region, mis-recognition of the metal portions or the like as a lead is prevented, and the lead recognition accuracy is improved.

Further, because image-processing-use component is created using the lead recognition results of the present disclosure, the automatic creation of image-processing-use component data based on the mis-recognition of a metal portion or the like that is easily confusable with a lead as a lead is prevented, and it is possible to automatically create image-processing-use component data with higher reliability than that created with conventional technology.

As a countermeasure to a case in which a row of leads appears in the image in a diagonal direction, a line on which cyclical waveform analysis is performed may be set in a diagonal direction of the image (for example, a direction diagonal from the corners of the image, or a direction at a 45 degree angle to the horizontal direction).

Also, cyclical waveform analysis along a line is not limited to using a normalized square difference function or an average magnitude difference function, a Fourier transformation or the like may be used; that is, the lead recognition target region may be identified using a function or analysis method suitable for evaluating whether a brightness change is cyclical.

REFERENCE SIGNS LIST

11: computer (waveform analyzing means, image recognition means, image-processing-use component data creation means); 12: camera

The invention claimed is:

1. A method for recognizing leads by processing an image captured by a camera of a component provided with a single row or multiple rows of leads of the same size and shape at a regular pitch, the method comprising:
   first, performing waveform analysis of a change pattern of brightness along multiple lines extending across the image and set in a vertical, a horizontal, or a diagonal direction of the image;
   second, identifying a region in which the brightness changes cyclically as a lead recognition target region, in which there is a possibility of a lead existing, based upon the waveform analysis;
   third, performing lead image recognition in the lead recognition target region; and
   fourth, mounting a leaded component using a component mounter based upon the lead image recognition.

2. The method according to claim 1, wherein the lead recognition target region is identified using one of a normalized square difference function, an average magnitude difference function, and a Fourier transformation.

3. A device for recognizing leads by processing an image captured by a camera of a component provided with a single row or multiple rows of leads of the same size and shape at a regular pitch, the device comprising:
   a processor configured to:
      first, perform waveform analysis of a change pattern of brightness along multiple lines extending across the image and set in a vertical, a horizontal, or a diagonal direction of the image;
      second, identify a region in which the brightness changes cyclically as a lead recognition target region, in which there is a possibility of a lead existing, based upon the waveform analysis;
      third, perform lead image recognition in the lead recognition target region;
      fourth, mount a leaded component using a component mounter based upon the lead image recognition.

4. The device according to claim 3, wherein the processor is configured to identify the lead recognition target region using one of a normalized square difference function, an average magnitude difference function, and a Fourier transformation.

5. The method according to claim 1, further comprising:
   creating imaging-processing-use component data including at least one of lead position, lead quantity, lead pitch, lead width, or lead length, using a recognition result of leads from the lead image recognition; and
   mounting the leaded component using the component mounter based upon the image-processing-use component data.

6. The device according to claim 3, wherein the processor is configured to
   create imaging-processing-use component data including at least one of lead position, lead quantity, lead pitch, lead width, or lead length, using a recognition result of leads from the lead image recognition; and
   mount the leaded component using the component mounter based upon the image-processing-use component data.

7. A system for recognizing leads by processing an image captured by a camera of a component provided with a single row or multiple rows of leads of the same size and shape at a regular pitch, the device comprising:
   a processor configured to:
      first, perform waveform analysis of a change pattern of brightness along multiple lines extending across the image and set in a vertical, a horizontal, or a diagonal direction of the image,
      second, identify a region in which the brightness changes cyclically as a lead recognition target region, in which there is a possibility of a lead existing, based upon the waveform analysis, and
      third, perform lead image recognition in the lead recognition target region; and
   a component mounter configured to mount a leaded component based upon the lead image recognition.

8. The system according to claim 7, wherein the processor is configured to identify the lead recognition target region using one of a normalized square difference function, an average magnitude difference function, and a Fourier transformation.

9. The system according to claim 7, wherein
   the processor is configured to create imaging-processing-use component data including at least one of lead position, lead quantity, lead pitch, lead width, or lead length, using a recognition result of leads from the lead image recognition, and
   the component mounter is configured to mount the leaded component based upon the image-processing-use component data.

10. The method according to claim 1, wherein identifying the region as the lead recognition target region includes determining end coordinates of the lead recognition target region based upon a standard deviation of a pitch width of the change pattern of brightness.

11. The device according to claim 3, wherein the processor is configured to identify the region as the lead recognition target region includes determining end coordinates of the lead recognition target region based upon a standard deviation of a pitch width of the change pattern of brightness.

12. The system according to claim 7, wherein the processor is configured to identify the region as the lead recognition target region includes determining end coordinates of the lead recognition target region based upon a standard deviation of a pitch width of the change pattern of brightness.

* * * * *